Jan. 12, 1943.    V. H. DANKE    2,307,824
CORN HUSKER
Filed Aug. 18, 1941    2 Sheets-Sheet 1
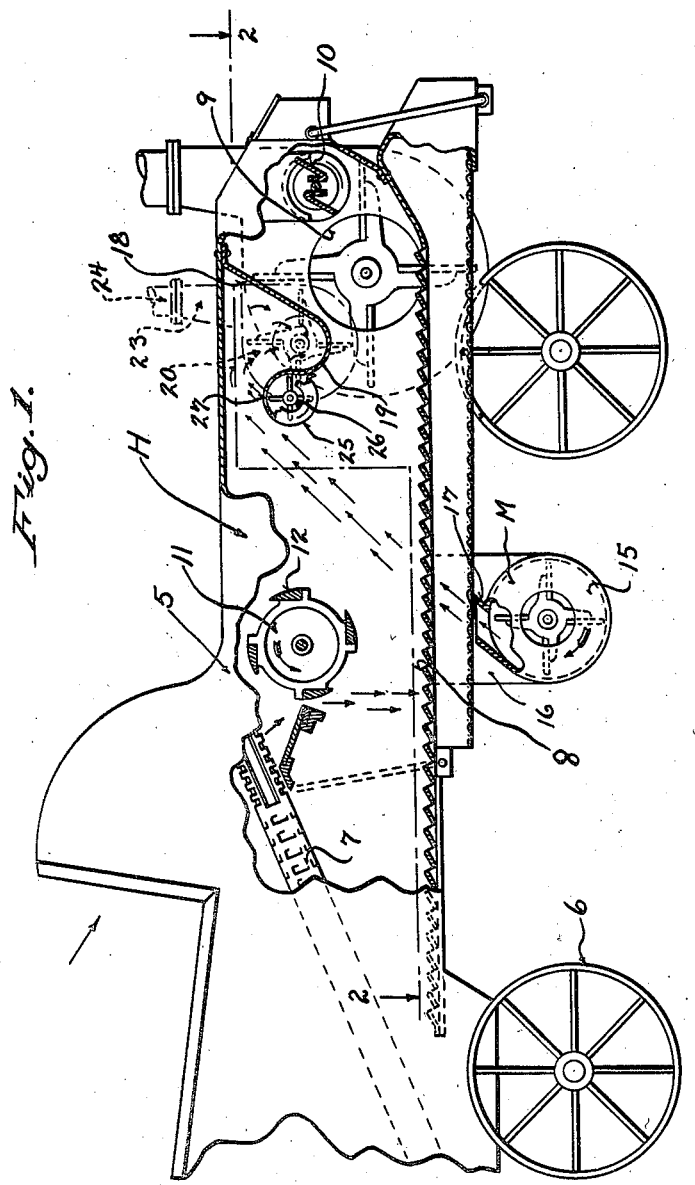
INVENTOR
VERNON H. DANKE
BY
ATTORNEYS

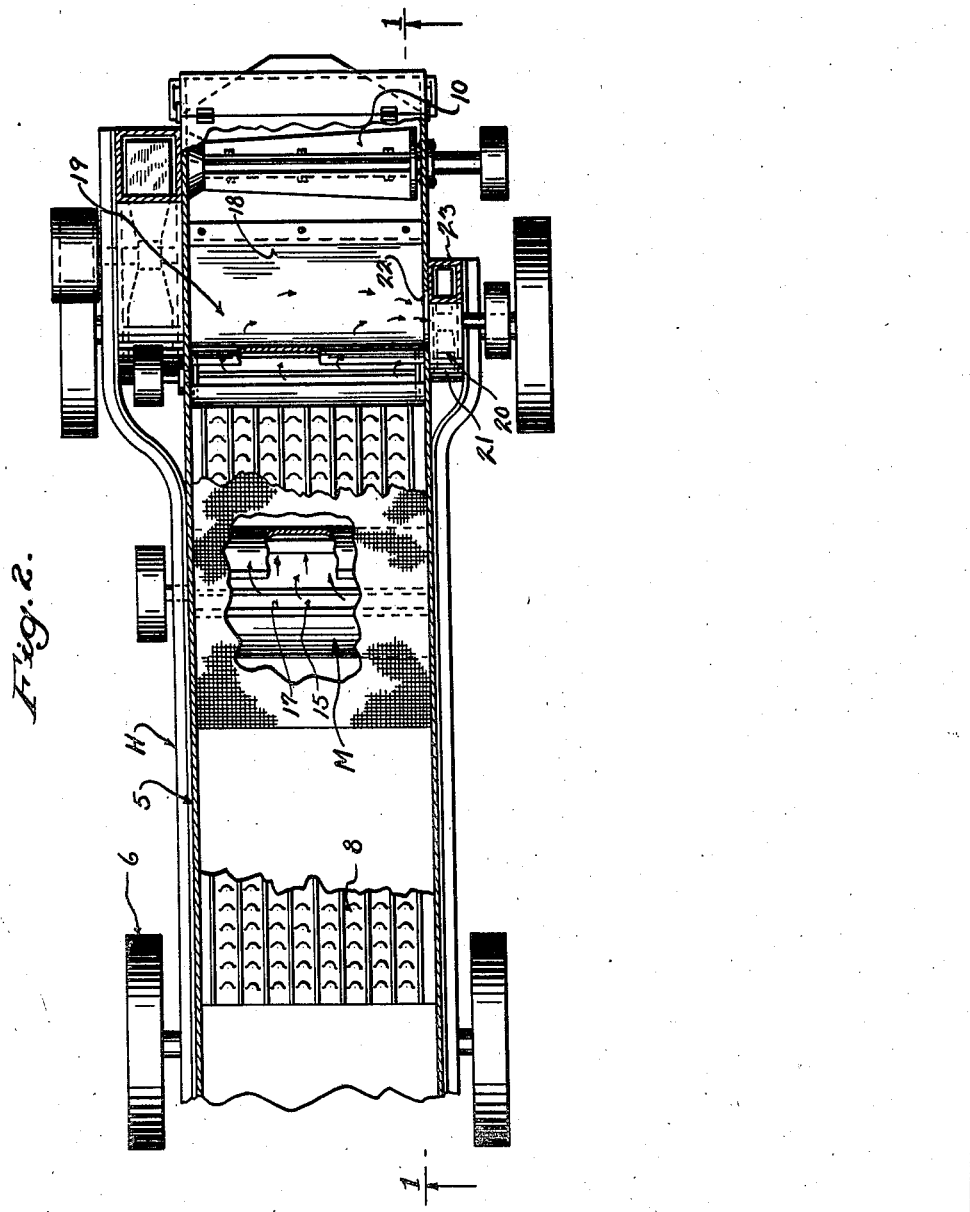

Patented Jan. 12, 1943

2,307,824

UNITED STATES PATENT OFFICE 2,307,824

CORNHUSKER

Vernon H. Danke, Oshkosh, Wis.

Application August 18, 1941, Serial No. 407,289

5 Claims. (Cl. 146—76)

This invention appertains to corn huskers, and more particularly to a novel mechanism arranged in the cornhusker for separating the leaves and other light material from the heavy chopped stalks.

There is a tendency (and this is particularly true of hybrid seed corn) for the cornstalks to remain sappy for a great length of time, and, consequently, the farmers endeavor to let the cut corn stand to dry out the stalks before handling. This is not good farming practice, for if the corn crop is left too long in the fields, the same is liable to freeze, and the ground cannot be placed in proper condition for the spring. Also, the leaves (which have the best food value) dry out and blanch to too great an extent. Where the corn is handled in a green condition in the corn huskers now found in the open market, the leaves and the shredded sappy stalks are all placed in a silo together and the leaves and husks become mouldy.

Therefore, it is a primary object of my invention to provide means for permitting the efficient handing of the corn crop in a more or less green condition and to provide means in the corn husker for separating the leaves, husks, and other light material from the heavy sappy stalks, whereby the leaves and other light material can be conveniently stored separate from the heavy green stalks, so that the crop can be harvested and handled earlier and thereby permit the light fodder to be received in its best condition. While the green, sappy, cut stalks have little food value, the same can be saved and stored in a silo and used as a food filler.

Another important object of my invention is to eliminate the shredder blades on the rotary cutter, whereby to lessen the likelihood of the sap running from the stalks and impregnating the light material.

A further important object of my invention is the provision of a fodder blower for the leaves and other light material arranged in advance of the blower for the heavy cut stalks, with means for delivering a blast of air through the shaker trough for carrying said leaves and other light material to the light fodder blower.

A still further important object of my invention is the provision of a metal deflector forming a receiving trough for the light fodder extending transversely across the body of the machine in front of and above the stalk blower and leading toward the light fodder blower, with means adjacent the front of the deflector to aid in the carrying of the light fodder in said trough and to prevent clogging of the material at the entrance to said trough.

With these and other objects in view, the invention consists in the novel construction, arrangement, and formation of parts, as will be hereinafter more specifically described, claimed, and illustrated in the accompanying drawings, in which drawings:

Fig. 1 is a longitudinal sectional view through a corn husker constructed in accordance with my invention, the view being taken substantially on the line 1—1 of Figure 2.

Figure 2 is a horizontal sectional view through the husker, taken substantially on the line 2—2 of Figure 1, looking in the direction of the arrows.

Referring to the drawings in detail, wherein similar reference characters designate corresponding parts throughout the several views, the letter H generally indicates a corn husker, and M my novel separating mechanism associated therewith.

The corn husker H is of the same general character now extensively sold in the open market, and hence, the same includes the longitudinally extending body or casing 5 mounted upon a wheeled frame or running gear 6.

Disposed at the front of the machine below the feed table are the usual snapping and husking rolls 7. A shaking trough 8 is arranged in the bottom of the machine, and the trough advances the cut material toward a fodder blower 9, as in the usual construction. A beater 10 is arranged in rear of and slightly above the intake of the fodder blower 9.

As the stalks are fed between the rolls 7, the same are cut in short lengths by a rotary cutter 11 Attention is called to the fact that the rotary cutter 11 is provided with cutting knives 12 only, and I entirely eliminate the shredding blades on the cutter, for a purpose whch will be later set forth.

From the description so far, it can be seen that the chopped stalks, leaves, husks, and other light material drop from the rolls 7 onto the shaker trough 8. The snapped ears of corn are fed out of the machine from the lower ends of the rolls 7.

With a machine of this type, the leaves, cut stalks, and the like are all fed to the blower 9, and, consequently, if the stalks are in a sappy condition, the fodder tends to mold and spoil in the silo.

In accordance with my invention, I arrange in the husker H my novel mechanism M for separating the leaves and other light material from the heavy sappy stalks, so that these stalks alone will be delivered to the blower 9. The mechanism M includes a transversely extending blast fan 15 arranged below the shaker trough, and this fan extends completely across the body of the machine and is suspended from the frame thereof by suitable hangers 16. The outlet 17 of the blast fan also extends entirely across the of the machine and is directed rearwardly and upwardly and is disposed substantially below the rotary cutter 12. Thus, a blast of air is delivered through the shaking trough in an upward and rearward direction for lifting the leaves and other light material from the heavy stalks.

Arranged slightly above and in front of the stalk blower 9 is a metal deflector shield 18. This shield extends entirely across the body or casing 5 of the machine, and is shaped to form a trough 19 in which the leaves and other light material are blown by a blast of air from the blast fan 15. The trough leads toward a light fodder blower 20, and this blower can be arranged on the opposite side of the body of the husker from the stalk blower 9, as is best shown is Figure 2.

The light fodder blower 20 includes the usual blower housing 21 having an axial inlet 22 which communicates with the trough 19. The housing 21 for the blower 20 is provided with the tangentially extending outlet 23, which leads to a stacker conveyor pipe 24. If preferred, the pipe 24 can lead directly into a place of storage.

In order to prevent the clogging of the light material at the entrance to the trough 19 and to aid in carrying the light material into the trough, I provide an auxiliary blast fan or blower 25. This auxiliary blast fan or blower 25 is arranged at the front of the shield, and the casing of the auxiliary blower or fan can form a continuation of the shield, if such should be desired. This auxiliary blower or fan extends the full length of the shield and is provided with an axial air inlet 26 and a longitudinally extending air outlet 27. This outlet is at the top and slightly at the rear of the auxiliary fan or blower 25, and, thus, the auxiliary blast of air is disposed directly at the entrance of the trough, and as the light material is carried upward by the blast of air from the main blast fan 15, the light material is met by the second or auxiliary blast of air and directed into said trough.

From the description so far, it can be seen that I have provided an efficient mechanism incorporated directly with a corn husker for effectively separating leaves and other light material from heavy cut stalks, and that the leaves and light material are carried out of the husker separate from the cut stalks.

As heretofore stated, I eliminate the shredder blades on the rotary cutter 12, and this prevents the stalks from being torn apart, and, hence, the stalks will retain a great amount of their sap. This prevents the light material from being impregnated with the sap.

Obviously, with my appliance, the corn husker can effectively handle green sappy cornstalks, and the valuable food fodder can be separated from such stalks and stored and kept in a prime condition.

Changes in details may be made, which do not depart from the spirit and scope of my claims, and what I claim as new is:

1. In a corn husker including a housing having a feed table, a rotary cutter for the stalks, a shaker trough below the cutter and table, and a blower at the rear of said trough for receiving cut material, means for separating the light material from the heavy cut stalks including a blast fan for delivering a blast of air through the shaker trough in advance of the stacker blower, a trough arranged above the shaker trough and above and in advance of the blower for receiving the light material, and a blower conveyor for said trough.

2. In a corn husker and fodder cutter having a reciprocative shaker trough for receiving cut stalks, leaves, and the like, a blast fan for directing a blast of air through the shaker trough to separate leaves and other light material from the heavy cut stalks, a transversely extending trough arranged above the shaker trough for receiving the leaves and other light material, a blower conveyor for the heavy stalks arranged at the rear and at one side of the shaker trough and slightly below the trough for the leaves and light material, and a blower conveyor for the light material arranged at one side of the trough and having its inlet communicating with said trough.

3. In a corn husker and fodder cutter having a reciprocative shaker trough for receiving cut stalks, leaves, and the like, a blast fan for directing a blast of air through the shaker trough to separate leaves and other light material from the heavy cut stalks, a transversely extending trough for receiving the leaves and other light material, a blower conveyor for the heavy stalks arranged at the rear and at one side of the shaker trough, a blower conveyor for the light material arranged at one side of the trough and having its inlet communicating with said trough, and means including a secondary blast fan at the front end of said transversely extending trough for preventing the clogging of the entrance to said trough by said light material.

4. In a corn husker and fodder cutter having a reciprocative shaker trough for receiving cut stalks, leaves, and the like, a blast fan for directing a blast of air through the shaker trough to separate leaves and other light material from the heavy cut stalks, a transversely extending trough for receiving the leaves and other light material, a blower conveyor for the heavy stalks arranged at the rear and at one side of the shaker trough, a blower conveyor for the light material arranged at one side of the trough and having its inlet communicating with said trough, and means for preventing the clogging of the entrance to said trough by said light material, said anti-clogging means including an auxiliary blast fan having rearwardly and upwardly directed outlets arranged at the front of said transversely extending trough.

5. In a corn husker and fodder cutter, a reciprocative shaker trough for receiving the fodder, means for delivering a blast of air through the shaker trough for carrying leaves and light material from the trough, a blower conveyor for receiving the heavy material from the trough, a deflector shield arranged above the trough for receiving the light material, a blower conveyor for receiving the light material from the deflector shield, and means for creating an auxiliary blast of air in front of the shield to aid in carrying the light material in said shield.

VERNON H. DANKE.